US011258901B2

(12) United States Patent
Deole et al.

(10) Patent No.: US 11,258,901 B2
(45) Date of Patent: Feb. 22, 2022

(54) ARTIFICIAL INTELLIGENCE DRIVEN SENTIMENT ANALYSIS DURING ON-HOLD CALL STATE IN CONTACT CENTER

(71) Applicant: Avaya Inc., Santa Clara, CA (US)

(72) Inventors: Pushkar Yashavant Deole, Pune (IN); Sandesh Chopdekar, Pune (IN); Navin Daga, Silapathar (IN)

(73) Assignee: Avaya Inc., Santa Clara, CA (US)

( * ) Notice: Subject to any disclaimer, the term of this patent is extended or adjusted under 35 U.S.C. 154(b) by 180 days.

(21) Appl. No.: 16/458,370

(22) Filed: Jul. 1, 2019

(65) Prior Publication Data
US 2021/0005217 A1    Jan. 7, 2021

(51) Int. Cl.
*H04M 3/428* (2006.01)
*G10L 25/63* (2013.01)
*H04M 3/22* (2006.01)

(52) U.S. Cl.
CPC ......... *H04M 3/4285* (2013.01); *G10L 25/63* (2013.01); *H04M 3/2227* (2013.01); *H04M 3/4286* (2013.01)

(58) Field of Classification Search
None
See application file for complete search history.

(56) References Cited

U.S. PATENT DOCUMENTS

| | | | |
|---|---|---|---|
| 6,681,511 B1 | 1/2004 | Huber | |
| 7,684,556 B1* | 3/2010 | Jaiswal | H04M 3/5166 379/266.01 |
| 9,178,999 B1 | 11/2015 | Hegde et al. | |
| 9,413,891 B2 | 8/2016 | Dwyer et al. | |
| 2003/0174829 A1 | 9/2003 | Dezonno et al. | |
| 2005/0163302 A1* | 7/2005 | Mock | H04M 3/523 379/211.02 |
| 2005/0175167 A1* | 8/2005 | Yacoub | H04M 3/523 379/265.13 |
| 2008/0040110 A1* | 2/2008 | Pereg | G10L 17/26 704/236 |
| 2010/0325216 A1 | 12/2010 | Singh et al. | |
| 2014/0140497 A1* | 5/2014 | Ripa | H04M 3/5133 379/265.06 |
| 2014/0282083 A1 | 9/2014 | Gaetano, Jr. et al. | |
| 2017/0078486 A1 | 3/2017 | Koga | |
| 2018/0012232 A1 | 1/2018 | Sehrawat et al. | |
| 2018/0103149 A1 | 4/2018 | Skiba et al. | |

(Continued)

OTHER PUBLICATIONS

Belson, Ken; Jan. 11, 2005; "Your Call (and Rants on Hold) Will Be Monitored;" The New York Times; Retrieved Jul. 1, 2019, from https://www.nytimes.com/2005/01/11/business/your-call-and-rants-on-hold-will-be-monitored.html.

(Continued)

*Primary Examiner* — Antim G Shah
(74) *Attorney, Agent, or Firm* — Stevens & Showalter LLP

(57) ABSTRACT

Aspects of the present disclosure include monitoring a contact's communication device while a communication session is in a hold state to determine a sentiment of the contact. Natural language recognition and natural language processing are used to determine a sentiment score of the contact based on overheard communications while the communication session is in the hold state. Then, an action is performed based on the sentiment score of the contact.

13 Claims, 4 Drawing Sheets

(56) References Cited

U.S. PATENT DOCUMENTS

2018/0124238 A1     5/2018  Shah et al.

OTHER PUBLICATIONS

Nsubuga, Jimmy; Jun. 3, 2017; "Call Centres Can Hear Everything You Say when They Put You on Hold;" Metro News; Retrieved Jul. 1, 2019, from https://metro.co.uk/2017/06/03/call-centres-can-hear-everything-you-say-when-they-put-you-on-hold-6681511/.

Haile, Feben; Final Office Action; U.S. Appl. No. 15/337,479; dated Jul. 26, 2018; United States Patent and Trademark Office; Alexandria, VA.

Haile, Feben; Office Action; U.S. Appl. No. 15/337,479; dated Feb. 2, 2018; United States Patent and Trademark Office; Alexandria, VA.

Haile, Feben; Office Action; U.S. Appl. No. 15/337,479; dated Oct. 2, 2018; United States Patent and Trademark Office; Alexandria, VA.

Larson, Jace; Aug. 2, 2018; "Are You Being Recorded While Placed on Hold?"; ABC Action News; Retrieved Jul. 1, 2019, from https://www.abcactionnews.com/news/national/are-you-being-recorded-while-placed-on-hold.

Haile, Feben; Final Office Action; U.S. Appl. No. 15/337,479; dated Jul. 29, 2019; United States Patent and Trademark Office; Alexandria, VA.

Haile, Feben; Office Action; U.S. Appl. No. 15/337,479; dated Mar. 21, 2019; United States Patent and Trademark Office; Alexandria, VA.

\* cited by examiner

ARTIFICIAL INTELLIGENCE DRIVEN SENTIMENT ANALYSIS DURING ON-HOLD CALL STATE IN CONTACT CENTER

BACKGROUND

Various aspects of the present invention relate generally to the technological field of contact center optimization and specifically to using artificial intelligence to determine when and how to interrupt a call on hold at a contact center through sentiment analysis.

Contact centers are employed by many enterprises to service inbound and outbound telephonic calls, e-mails, chats, other communications, etc. from contacts (i.e., customers). A typical contact center includes a switch and/or server to receive and route incoming packet-switched and/or circuit-switched requests and one or more resources, such as human agents and automated resources (e.g., Interactive Voice Response (IVR) units), to service the incoming requests. Contact centers distribute communication sessions, whether inbound or outbound, for servicing to any suitable resource according to certain predefined criteria.

At some point during a communication session between a contact and a resource, the resource may need to look up information or be required to step away from a device handling the communication session (e.g., phone, computer, etc.). At such times, the communication session is placed in a hold state. Aspects of the present disclosure address when a communication session is in the hold state.

BRIEF SUMMARY

According to aspects of the present disclosure, a process for determining actions to perform based on a sentiment analysis of a contact during a communication session at a contact center comprises receiving, at a contact center, a communication session request from a contact via a device of the contact. Further, a communication session is established between the device of the contact and a device of a resource of the contact center, a request to place the communication session in a hold state is received, and the communication session is placed in the hold state. While the communication session is in the hold state, communications from the contact are monitored and analyzed to determine a sentiment score, which is compared to a threshold. An action is performed based on the comparison of the sentiment score of the contact to the threshold.

DETAILED DESCRIPTION

According to aspects of the present disclosure, a hold manager application manages a contact while that contact is on hold during a communication session at a contact center. The hold manager application monitors communications from the contact while the communication session is in a hold state. Using natural language recognition and processing, the hold manager application determines a sentiment of the contact and based on that sentiment, causes an action to be performed.

For example, during a communication session in a hold state, if a contact utters "why is this taking so long", then the hold manager application may take that utterance as an indication that the contact is frustrated. In response, the hold manager application may send an alert to the device of the agent, so the agent will restore the communication session from the hold state to an active state. Other actions and ways to determine a sentiment of a contact are discussed in greater detail below.

Figure 1:
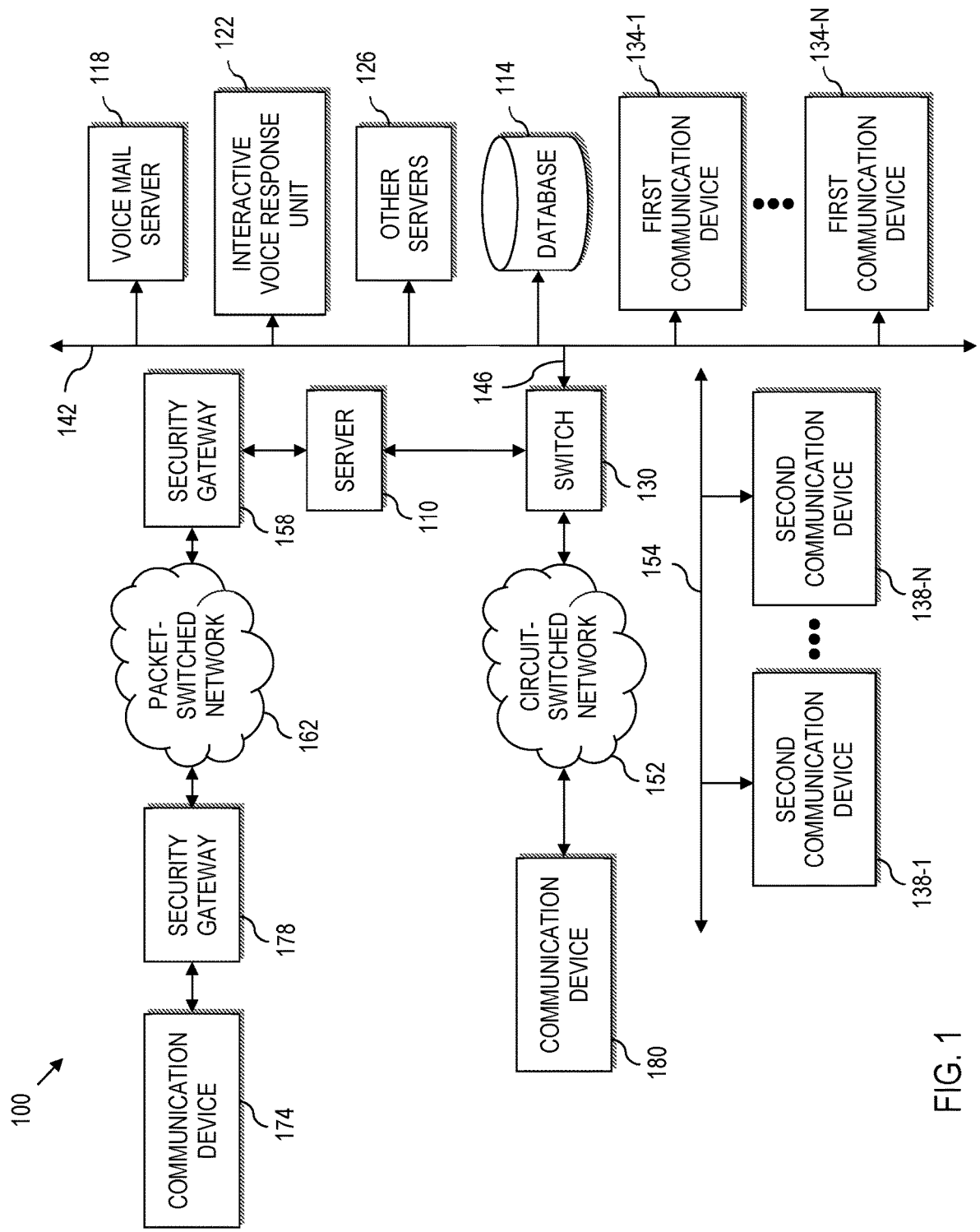
FIG. 1 is a block diagram illustrating a contact center infrastructure, according to various aspects of the present disclosure.

Referring to the drawings, FIG. 1 shows a block diagram of a contact center 100 that comprises a server 110; a set of data stores or database 114 containing contact or customer related information and other information that may enhance the value and efficiency of the contact processing; a plurality of servers (e.g., a voice mail server 118, an Interactive Voice Response unit (IVR) 122, and other servers 126); a switch 130; a plurality of working agents operating packet-switched (first) communication devices 134-1-N (such as computer work stations or personal computers); and/or circuit-switched (second) communication devices 138-1-M, which are interconnected by a Local Area Network (LAN) 142, or Wide Area Network (WAN). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. Further, the security gateway 158 may be implemented as hardware such as via an adjunct processor (as shown) or as a chip in the server.

Although systems herein are discussed with reference to client-server architecture, it is to be understood that the principles of the present invention apply to other network architectures. For example, aspects of the present disclosure may apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, packet- or circuit-switched networks are not required.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ PrivateBranch Exchange (PBX)-based ACD system, MultiVantage™ PBX, Communication Manager™, S8300™ media server and any other media servers, SIP Enabled Services™ Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™ IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch, server, or first and second communication devices (i.e., the invention may be implemented with any desired type of transport medium as well as combinations of different types of transport channels).

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with an external first communication device 174 via a security gateway 178 and the circuit-switched network 152 with an external second communication device 180. Note that the external communication devices 174, 180 may be devices associated with contacts who contact the contact center 100.

In a preferred configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

As will be appreciated, the server 110 is notified via the LAN 142 of an incoming contact by communications component (e.g., switch 130, fax server, email server, Web Server, and/or other servers) receiving the incoming contacts as shown in FIG. 1. The incoming contact is held by the receiving telecommunications component until the server 110 forwards instructions to the component to forward or route the contact to a specific contact center resource, such as the IVR unit 122, the voice mail server 118, and/or first or second communication devices 134-1-N, 138-1-M associated with a selected agent. The server 110 distributes and connects these contacts to telecommunication devices of available agents based on the predetermined criteria noted above. When the server 110 forwards a contact to an agent, the server 110 also forwards customer-related information from the database 114 to the agent's computer work station for viewing (such as by a pop-up display) to permit the agent to better serve the customer of the contact center. Depending on the agent's profiles, their current working status, and parameters of the incoming contacts, the server 110 may assign a multichannel contact to the agents of the contact center. The agents process the incoming contacts sent to them by the server 110. This embodiment is particularly suited for a Customer Relationship Management (CRM) environment in which customers are permitted to use any media to contact an enterprise. In a CRM environment, both real-time and non-real-time contacts must be handled and distributed with equal efficiency and effectiveness.

Figure 2:
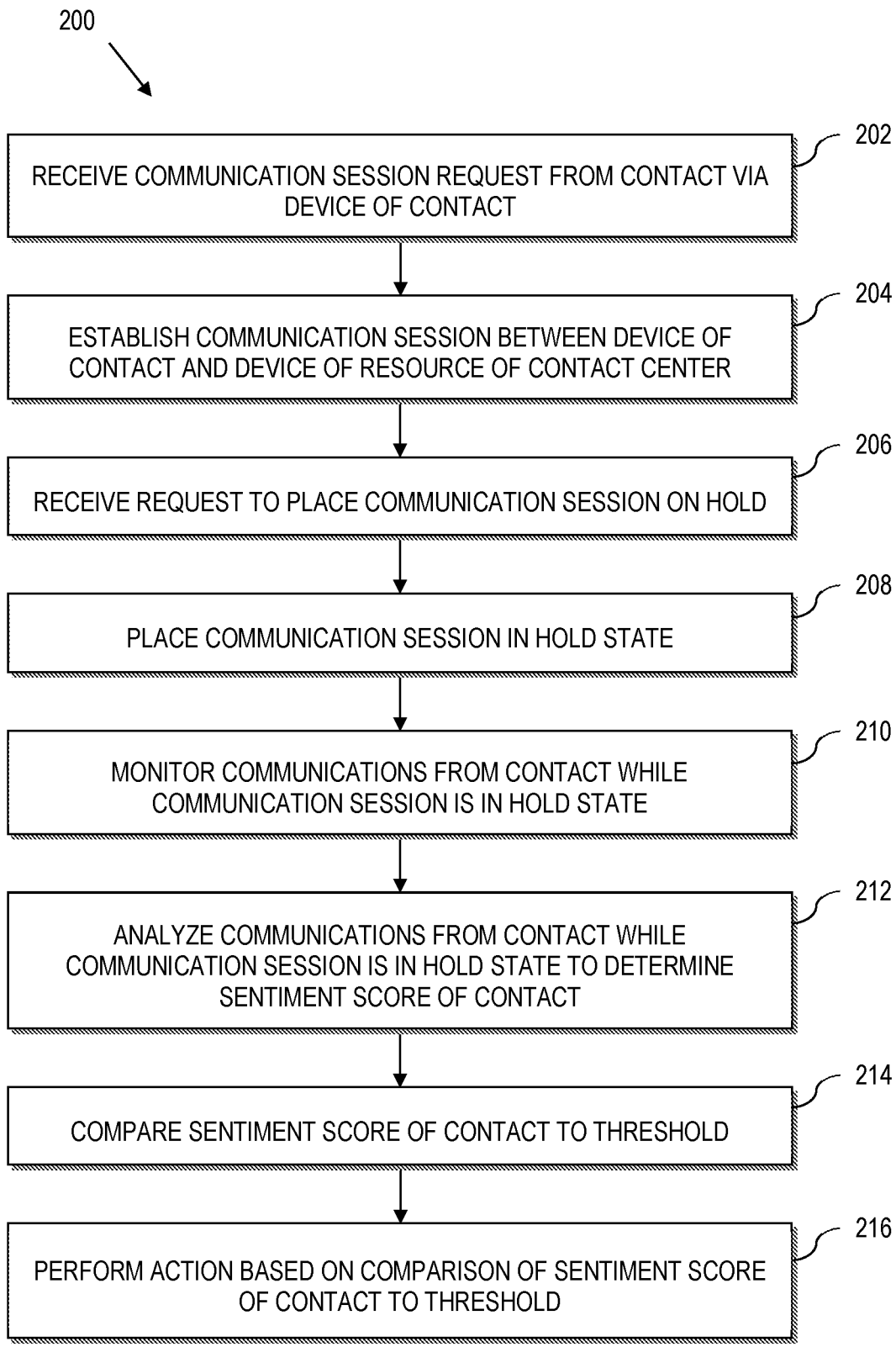
FIG. 2 is a flow chart illustrating a process for determining actions to perform based on a sentiment analysis of a contact during a communication session at a contact center, according to various aspects of the present disclosure.

FIG. 2 illustrates a process 200 for determining a sentiment of a contact while a communication session between the contact and an agent is in a hold state and then performing an action based on the sentiment analysis. The process 200 may be performed by any of the servers (see FIG. 1, ref. no. 110, 126) at the contact center, any of the communication devices (see FIG. 1, ref. no. 134-1-N, 138-1-M), or combinations thereof.

At 202, a communication session request is received via a device (e.g., external devices 174, 180 of FIG. 1) of the contact. For example, the contact may use a telephone or a computer to call the contact center, requesting a communication session with a resource at the contact center.

At 204, a communication session is established between the device of the contact and a device of a resource (e.g., a human agent) of the contact center. The communication session may be created before the communication session is established between the device of the contact and the device of the resource. For example, the contact may request a communication session, which is then created between the device of the contact and an IVR unit (see 122, FIG. 1). After the contact interacts with the IVR unit, a server determines that the communication session should be transferred to an agent in a sales group at the contact center. The server (or other controller) then establishes the communication session between the device of the contact and the device of the resource.

At 206, a request to place the communication session in a hold state is received. For example, the agent may press a hold button on the device, which requests that the communication session be put in the hold state. As another example, the agent may use software running on the device to request that the communication session be put in the hold state.

At 208, the communication session is placed in the hold state. When the communication session is placed in a hold state, a hold manager application may be launched for that communication session. As such, in some embodiments, an instance of the hold manager application is running for each communication session that is in a hold state. In other embodiments, only one hold manager application is running for all communication sessions in the hold state. In various embodiments, a hold manager application is running for a subset of the communication sessions in the hold state.

At 210, the communication session in the hold state is monitored for communications. Usually, when a communication session is placed on hold, the parties are cut off from each other. However, in the process 200 of the present disclosure, the hold manager application monitors communications from the contact while the communication session is on hold.

At 212, the communications from the contact while the communication session is on hold are analyzed to determine a sentiment score for the contact. In some embodiments, the hold manager application passes the communications to an external natural language recognition and natural language processing engine to determine a sentiment score for the contact. Examples of an external natural language recognition and natural language processing engine include engines from Alexa, Cortana, Google Assistant, etc. In various embodiments, the natural language recognition and natural language processing engine is part of the hold manager application (i.e., an internal engine). In numerous embodiments, the natural language recognition and natural language processing engine uses a language, words, slang, sighs, etc. uttered by the contact, but also analyzes voice characteristics of the communications (e.g., tone of the communications, amplitude of the communications, etc.) to determine the sentiment score(s).

In some embodiments, the hold manager application (or another application, if the hold manager application is not running before the communication session is placed in the hold state) determines a context for the call. Then, after a context is determined, any communications outside of that context are filtered out. For example, if the communication session is in regard to finding pricing on an automobile, and while the communication session is on hold, the contact may discuss a baseball game with a friend. The hold manager application may filter out such communications, because a baseball game is outside the context of the communication session. Therefore, only communications that are relevant to the context of the communication session or that are not blatantly irrelevant to the context of the communication session are considered when determining the sentiment score of the contact.

The sentiment score may be derived in any desired way. For example, an overall sentiment score may range from one to ten and indicate how irritated the contact is. The sentiment score may be on any scale (e.g., one to ten, zero to one hundred, negative twenty to positive twenty, etc.). As another example, several different sentiment states may have their own score on a scale (e.g., irritated, bored, satisfied, happy, frustrated, etc.). Then those individual sentiment scores may be kept separate, combined into a single score, or both. If they are combined into a single score, the individual sentiment scores may be averaged together, averaged with weights placed on each individual score, choosing a dominant (e.g., the highest) individual sentiment score as the overall sentiment score, etc.

At 214, the sentiment score is compared to a threshold. In some embodiments, the threshold is a predetermined threshold that remains static. For example, the threshold may be set to a seven as a predetermined threshold. As another example of a static threshold, the threshold may be determined based off of a desired number, and then modified based on another parameter. For example, the static threshold may be a function of a profile of the contact (e.g., age of the contact, whether the contact is suffering from illness, whether the contact is physically challenged, a priority of the contact, etc., or combinations thereof).

In various embodiments, the threshold may be a dynamic threshold that changes over time. For example, the threshold may be based on an amount of time that the communication session has been on hold. As an example of a dynamic threshold, the threshold may be inversely proportional to the amount of time that the communication session has been on hold. As another example of a dynamic threshold, the threshold may be an inverse step that starts out at a ten and remains a ten until a period of time has passed when it changes to a six. Other formulae may be used for a dynamic threshold, including using the parameters listed above for the static threshold.

Further, in embodiments with more than one sentiment score, each sentiment score may be associated with its own static or dynamic threshold. Moreover, each sentiment score may be associated with multiple thresholds. For example, if an embodiment includes a first sentiment score for frustration and a second sentiment score for boredom, then the first sentiment score may include a static threshold at five and a dynamic threshold that changes over time, while the second sentiment score may include two dynamic thresholds that change over time according to two different functions (i.e., one function for each threshold). Each different threshold for a given sentiment score may result in a different action being performed as discussed below.

At 216, an action is performed based on the comparison of the sentiment score and the threshold(s) associated with the sentiment score. Any action may be performed, including but not limited to: transmitting an announcement to the device of the contact, transmitting an alert to the device of the agent, transmitting an alert to a device not associated with the contact or the agent, etc. For example, if the boredom sentiment score passes a threshold, then the hold manager instance may cause music to be played at the device of the contact, change music that is being played at the device of the contact, give the contact a choice of music to hear, pose a trivia question and answer at the device of the contact, send a status announcement to the device of the contact, etc. As another example, if the irritation sentiment score passes a threshold, then the hold manager instance may send an audio message to the device of the agent that explains that the contact is irritated, send a communication to the device of the agent to light up a button on the device of the agent, send a desktop notification to a computer of the agent (e.g., the notification may include the sentiment of the contact), etc. As a further example, if the irritation sentiment score passes a threshold, then the hold manager instance may send a communication to the device of the agent's supervisor to light up a button on the device of the agent's supervisor (i.e., a device not associated with the contact or the agent), send a desktop notification to a computer of the agent's supervisor (e.g., the notification may include the sentiment of the contact), etc.

In a first example of the process 200 of FIG. 2, a contact uses a telephone to call a contact center about a warranty on a television. A server at the contact center receives the call and establishes a communication session between the contact and an interactive voice response (IVR) system. The contact interacts with the IVR system and the server determines that a context of the call includes a warranty on a television and establishes the communication between a desktop computer (using voice-over-Internet-protocol (VOIP)) of an agent. The contact asks a question that the agent cannot immediately answer, so the agent indicates that she will place the communication in a hold state to the contact, and the contact agrees. The agent selects "Place on Hold" from a pull-down menu in an application running on the agent's desktop computer, requesting that the communication session be placed in a hold state.

The server places the communication session in the hold state and launches an instance of a hold manager application dedicated to the communication session. The hold manager "listens" to the communication session while the communication session is on hold to monitor for communications received from the contact. About ten seconds into the communication session being in the hold state, the contact asks someone in the background, "What would you like for supper?" In this example, the hold manager is also filtering out communications that are not associated with the context of the call. As such, the hold manager determines that the utterance from the contact is outside the context of the communication session and filters out the utterance.

About a minute into the communication session being in the hold state (i.e., being on hold) the contact sighs. In this example, the hold manager includes a natural language recognition and natural language processing engine internally. As such, the hold manager analyzes the sigh from the contact and determines that a sentiment score (ranging from 1-10) corresponding to happiness of the contact should be adjusted from an eight to a four while an irritation sentiment score advances from a two to a three. The happiness sentiment score has a corresponding static threshold of five, where a score equal to or above five means do not perform an action and a score below five means do perform the action. The irritation sentiment score has two corresponding thresholds: a first static threshold of eight and a second dynamic threshold that starts at ten and gets lowered by one for every minute that passes with a floor of four (i.e., the dynamic threshold never goes below four). Because a minute has passed, the dynamic threshold is currently at nine. If the score is above the static threshold, a first action is performed, and if the score is above the dynamic threshold, a second action is performed. The hold manager compares the scores to the thresholds, and determines the action associated with the single threshold of the happiness sentiment score should be performed. In this example, the action associated with the happiness score is to play soothing music to the contact via the communication session. As such, the hold manager causes music to be played to the contact via the contact's device.

A little over five minutes into the communication session being in the hold state, the contact states his dismay, "Oh heck, I cannot believe that I've been on hold for five minutes for such a simple question!" The communication is determined to be within the context of the communication session, and the sentiment scores are adjusted to a two for the happiness sentiment score and a seven for the irritation sentiment score. The happiness action (supplying music in this example) has already occurred, so it does not occur again (in this example, but in a different example embodiment maintaining a low happiness may cause the music to change to a different genre). However, the irritation sentiment score surpasses the dynamic threshold (which is now at a six, following the formula above) but below the static threshold. As such, the instance hold manager application performs an action associated with the dynamic threshold, which in this case is to display a popup communication on a display of the agent using the desktop computer, where the popup communication includes an identification of the contact, an identification of the communication session, how long the communication session has been in the hold state, and the two sentiment scores of the contact. After reading the popup communication, the agent requests that the communication session be restored from the hold state to an active state, and the instance of the hold manager is terminated. In some embodiments, the agent can temporarily restore the communication session from the hold state to an active state without terminating an instance of the hold manager. In such embodiments, the hold manager instance remains active until the communication session is fully (not just temporarily) in the active state.

In a second example of the process 200 of FIG. 2, the hold manager includes three sentiment scores that are combined into an overall sentiment score with the following weights (irritation-seven, boredom-one, impatience-two). In this example, the communication session is in the hold state and after one minute the contact yells, "I hate this crappy company!" The hold manager determines that the irritation sentiment score is a ten, the boredom sentiment score is a three, and the impatience sentiment score is a seven. In order to apply the weights, the weight for each score is multiplied by the score and the results are added together to determine the overall sentiment score. Thus, the overall sentiment score is seventy (irritation) plus three (boredom) plus fourteen (impatience), which is eighty-seven. This overall sentiment score is compared to a static threshold of eighty, and the hold manager performs an action of sending a popup communication to a device of the agent's manager. Then the agent's manager breaks into the communication session and tries to calm down the contact.

Embodiments of the process 200 maintain listening to a contact's communication device while a communication session is in a hold state to determine a sentiment of the contact. Natural language recognition and natural language processing are used to determine a sentiment score of the contact based on overheard communications while the communication session is in the hold state. Then, an action is performed based on the sentiment score of the contact. Such processes allow for the contact center to have a better overall experience for the contacts, because the contact will be less likely to hang up on the communication session while the communication session is in the hold state. Further, the process requires less interruption by the agent to determine the contact's sentiment, which heightens the overall efficiency of the contact center.

Figure 3:
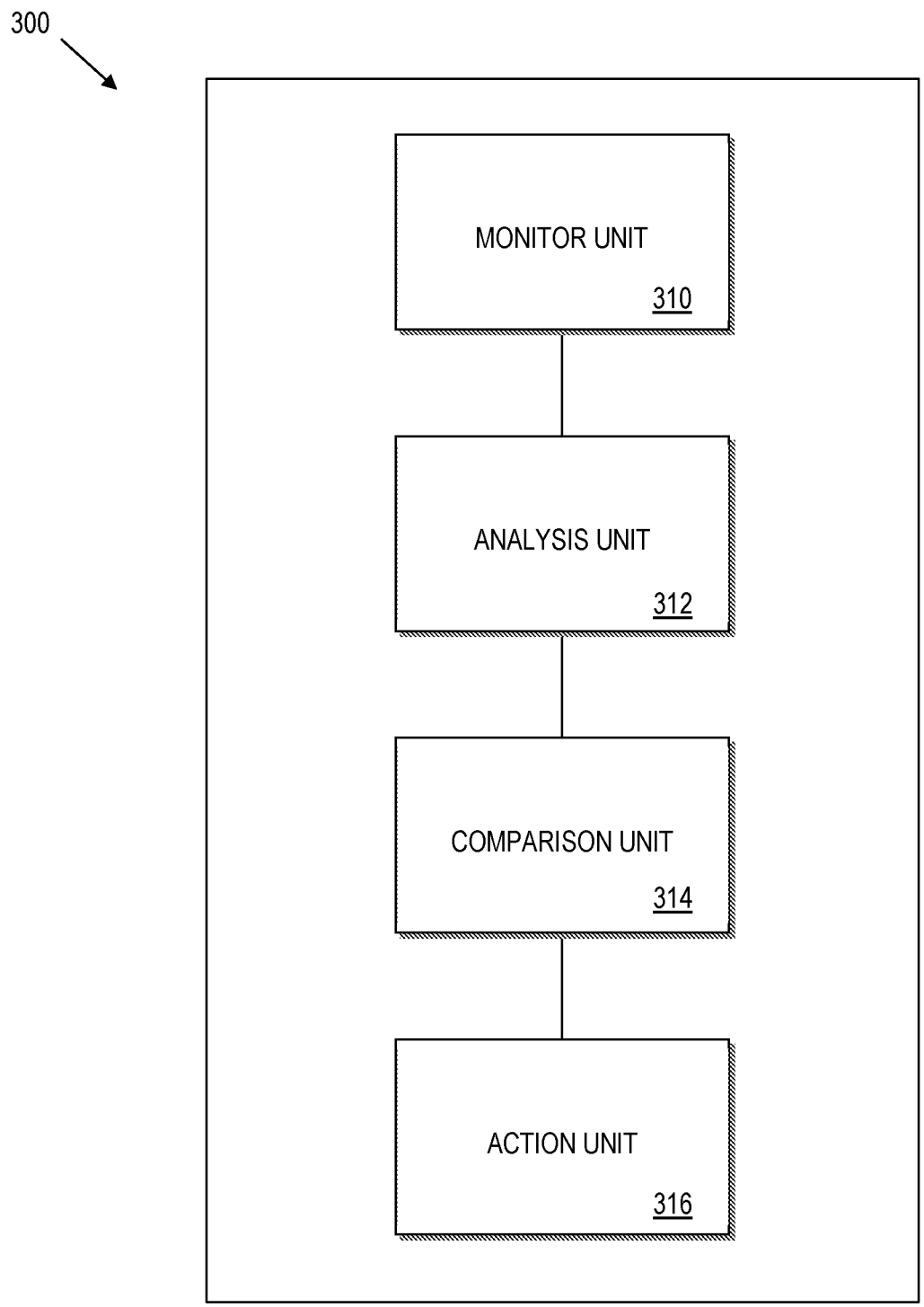
FIG. 3 is a block diagram illustrating a device for determining actions to perform based on a sentiment analysis of a contact during a communication session at a contact center, according to various aspects of the present disclosure.

FIG. 3 is a block diagram of an application specific integrated circuit (ASIC) 300 of a hold manager application, according to aspects of the present disclosure. The ASIC includes a monitor unit 310 that monitors a communication session that is in a hold state for communications. For example, if a noise is detected from the device of the contact (e.g., an amplitude of sound coming from the device of the contact is non-zero or above a threshold), then the noise is passed onto an analysis unit 312 for analysis. The analysis unit 312 analyzes the communication to determine a sentiment score of the contact. For example, the analysis unit 312 may include a natural language recognition and natural language processing engine (e.g., Alexa, Cortana, Google Assistant, etc.). In some embodiments, the analysis unit 312 receives a context (or accesses the context from a storage area either internal or external to the ASIC) of the communications session and filters out any communications that are not associated with the context. Any communications that are filtered out are not used to determine the sentiment score. As discussed above, there may be one or more sentiment scores determined from the communications. The sentiment score(s) are stored in local (i.e., internal) or remote (i.e., external) memory (not shown).

A comparison unit 314 compares (analog compare, digital compare, or both) one or more of the sentiment scores to one or more associated thresholds. As discussed above, the thresholds may be static or dynamic. An action unit 316 determines an action based on the comparison unit and performs the action. For example, a look-up table may include actions based on comparison results to determine the action. As another example, a rules engine may determine the action. Once the action is determined, the action is performed.

Figure 4:
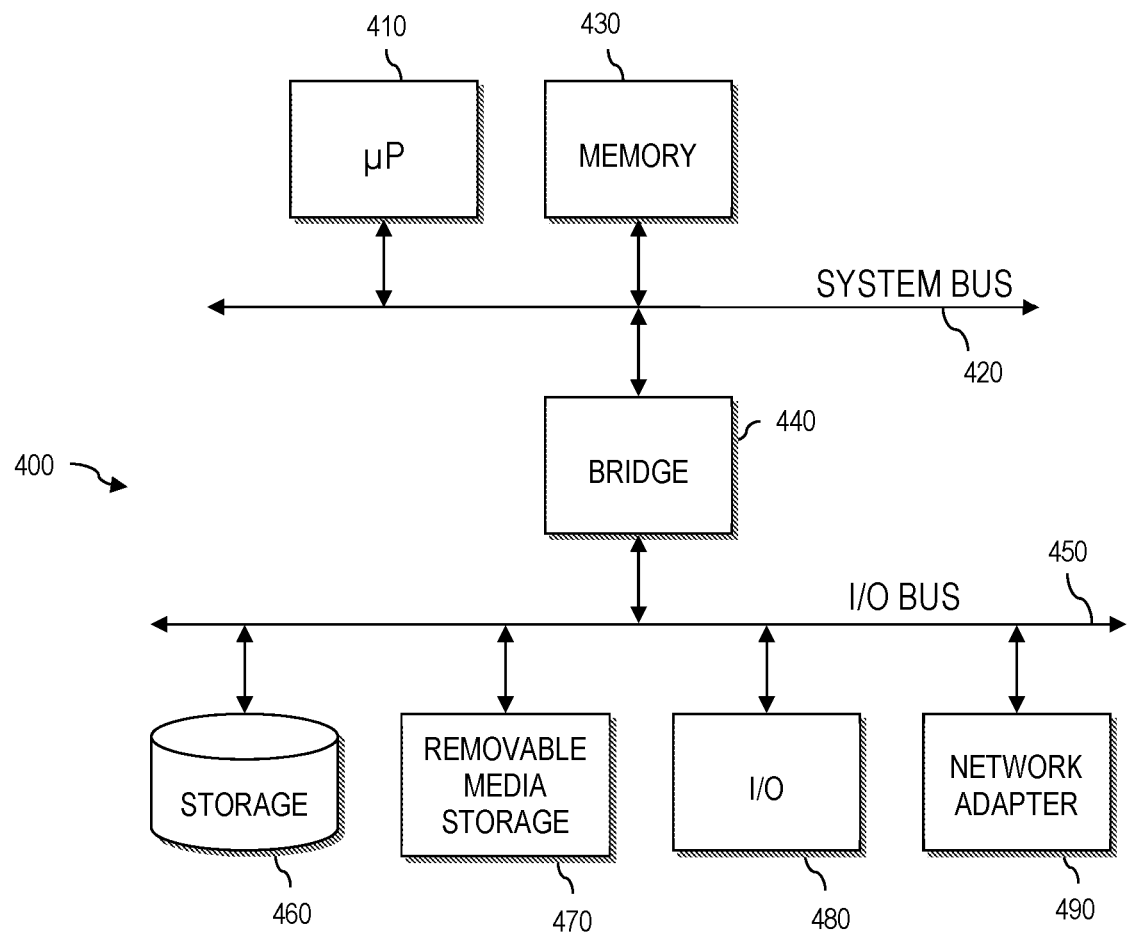
FIG. 4 is a block diagram of a computer system having a computer readable storage medium for implementing functions, according to various aspects of the present invention, as described in greater detail herein.

Referring to FIG. 4, a block diagram of a data processing system is depicted in accordance with the present invention. Data processing system 400 may comprise a symmetric multiprocessor (SMP) system or other configuration including a plurality of processors 410 connected to system bus 420. Alternatively, a single processor 410 may be employed. Also connected to system bus 420 is local memory 430. An I/O bus bridge 440 is connected to the system bus 420 and provides an interface to an I/O bus 450. The I/O bus may be utilized to support one or more buses and corresponding devices 470, such as storage 460, removable media storage 470, input/output devices (I/O devices) 480, network adapters 490, etc. Network adapters may also be coupled to the system to enable the data processing system to become coupled to other data processing systems or remote printers or storage devices through intervening private or public networks.

Also connected to the I/O bus may be devices such as a graphics adapter, storage and a computer usable storage medium having computer usable program code embodied thereon. The computer usable program code may be executed to implement any aspect of the present invention, for example, to implement any aspect of any of the methods and/or system components illustrated in FIGS. 1-3.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for determining actions to perform based on a sentiment analysis of a contact during a communication session at a contact center, the process comprising:
   receiving, at a contact center, a communication session request from a contact via a device of the contact;
   establishing a communication session between the device of the contact and a device of a resource of the contact center;
   receiving a request to place the communication session in a hold state;
   placing the communication session in the hold state;
   monitoring communications from the contact while the communication session is in the hold state;
   determining a context of the communication session;
   filtering out any communications that are not associated with the context of the communication session;
   analyzing the filtered communications from the contact while the communication session is in the hold state to determine a sentiment score of the contact;
   comparing the sentiment score of the contact to a dynamic threshold that is based off an amount of time the contact has been on hold; and
   performing an action based on the comparison of the sentiment score of the contact to the threshold.

2. The process of claim 1, wherein:
   performing an action based on the comparison of the sentiment score of the contact to the threshold includes transmitting an announcement to the device of the contact.

3. The process of claim 1, wherein:
   performing an action based on the comparison of the sentiment score of the contact to the threshold includes transmitting an alert to the device of the resource of the contact center.

4. The process of claim 1, wherein:
   performing an action based on the comparison of the sentiment score of the contact to the threshold includes transmitting an alert to a device not associated with the contact or the resource of the contact center.

5. The process of claim 1, wherein:
   performing an action based on the comparison of the sentiment score of the contact to the threshold includes changing music being transmitted to the device of the contact.

6. The process of claim 1, wherein:
   placing the communication session in the hold state includes launching an instance of a hold manager dedicated to the communications session;
   analyzing the communications from the contact while the communication session is in the hold state to determine a sentiment score of the contact is performed by the instance of the hold manager;
   comparing the sentiment score of the contact to a threshold is performed by the instance of the hold manager; and
   performing an action based on the comparison of the sentiment score of the contact to a threshold is performed by the instance of the hold manager and includes terminating the instance of the hold manager.

7. The process of claim 6, wherein the hold manager includes a natural language recognition and natural language processing application.

8. A system for determining actions to perform based on a sentiment analysis of a contact during a communication session at a contact center, the system comprising:
   a processor coupled to memory, where the memory includes a program that instructs the processor to perform:
   receiving, at a contact center, a communication session request from a contact via a device of the contact;
   establishing a communication session between the device of the contact and a device of a resource of the contact center;
   receiving a request to place the communication session in a hold state;
   placing the communication session in the hold state;
   monitoring communications from the contact while the communication session is in the hold state;
   determining a context of the communication session;
   filtering out any communications that are not associated with the context of the communication session;

analyzing the filtered communications from the contact while the communication session is in the hold state to determine a sentiment score of the contact;

comparing the sentiment score of the contact to a dynamic threshold that is based off an amount of time the contact has been on hold; and performing an action based on the comparison of the sentiment score of the contact to the threshold.

9. The system of claim 8, wherein:

performing an action based on the comparison of the sentiment score of the contact to the threshold includes transmitting an announcement to the device of the contact.

10. The system of claim 8, wherein:

performing an action based on the comparison of the sentiment score of the contact to the threshold includes transmitting an alert to the device of the resource of the contact center.

11. The system of claim 8, wherein:

performing an action based on the comparison of the sentiment score of the contact to the threshold includes transmitting an alert to a device not associated with the contact or the resource of the contact center.

12. The system of claim 8, wherein:

placing the communication session in the hold state includes launching an instance of a hold manager dedicated to the communications session;

analyzing the communications from the contact while the communication session is in the hold state to determine a sentiment score of the contact is performed by the instance of the hold manager;

comparing the sentiment score of the contact to a threshold is performed by the instance of the hold manager; and performing an action based on the comparison of the sentiment score of the contact to a threshold is performed by the instance of the hold manager and includes terminating the instance of the hold manager.

13. An application specific integrated circuit for determining actions to perform based on a sentiment analysis of a contact during a communication session at a contact center, the application specific integrated circuit comprising:

a monitoring unit that monitors communications from a contact while a communication session between a device of the contact and a device of a resource at the contact center is in a hold state;

an analysis unit that:

determines a context of the communication session;

filters out any communications that are not associated with the context of the communication session; and analyzes the filtered communications from the contact while the communication session is in the hold state to determine a sentiment score of the contact;

a comparison unit that compares the sentiment score of the contact to a dynamic threshold that is based off an amount of time the contact has been on hold; and an action unit that performs an action based on the comparison of the sentiment score of the contact to the threshold.

* * * * *